(12) United States Patent
Lee

(10) Patent No.: US 7,204,476 B2
(45) Date of Patent: Apr. 17, 2007

(54) SPEED-INCREASING MACHINE FOR WATER

(76) Inventor: Kuang-Chuan Lee, 4F., No. 11, Lane 125, Hansheng E. Rd., Banciao City, Taipei County (TW)

( * ) Notice: Subject to any disclaimer, the term of this patent is extended or adjusted under 35 U.S.C. 154(b) by 22 days.

(21) Appl. No.: 11/178,333

(22) Filed: Jul. 12, 2005

(65) Prior Publication Data

US 2007/0013087 A1   Jan. 18, 2007

(51) Int. Cl.
*B01F 3/04* (2006.01)

(52) U.S. Cl. .................................. 261/91; 261/120

(58) Field of Classification Search ............... 261/83, 261/84, 91, 120, DIG. 71
See application file for complete search history.

(56) References Cited

U.S. PATENT DOCUMENTS

| | | | | |
|---|---|---|---|---|
| 3,462,132 A | * | 8/1969 | Kaelin | 261/87 |
| 3,573,203 A | * | 3/1971 | Kaelin | 210/629 |
| 3,595,537 A | * | 7/1971 | Kaelin | 261/91 |
| 3,690,621 A | * | 9/1972 | Tanaka et al. | 366/265 |
| 6,997,444 B2 | * | 2/2006 | Weetman et al. | 261/91 |

* cited by examiner

*Primary Examiner*—Scott Bushey

(57) ABSTRACT

A speed-increasing machine for water includes a frame member, a plurality of buoyant members mounted to the lower end of the frame member, a motor mounted to the center of the frame member, and a shielding cover mounted outside the motor. A rotating shaft of the motor is attached to a guide vane set. The guide vane set has a plurality of guide plates for guiding the circulating water current. When driving the motor, the vanes rotate to circulate the water in the cultivation pool, to thereby uniformly increase the dissolved oxygen in the cultivation pool.

12 Claims, 11 Drawing Sheets

SPEED-INCREASING MACHINE FOR WATER

BACKGROUND OF THE INVENTION

This invention relates to a speed-increasing machine for water, which can be used in a cultivation pool in the aquaculture industry. By utilizing of the rotation of vanes, the circulation of water in the cultivation pool can be improved and the amount of oxygen dissolved in the water can thus be increased.

Water quality and dissolved oxygen in the cultivation pool are the most important factors for aquaculture. For high-density cultivation that is often adopted for saving cost, a large quantity of aquatics exists in a certain area, which may result in massive death of the aquatics when the water quality deteriorates or the dissolved oxygen is insufficient, leading to tremendous damage.

A typical cultivation pool is bounded in a certain area so that the water in the cultivation pool flows relatively slowly, resulting in insufficient dissolved oxygen. Therefore, Machines are often utilized to increase the dissolved oxygen in the water. A typical design available in the market is a small buoyant raft on which a motor is mounted for driving vanes attached to both sides of the raft. A portion of the vanes is above the water level, and the other portion of the vanes is below the water(so-called water wheel). As a result, water in the cultivation pool splashes when the vanes rotate so that water in the deep of the cultivation pool can come into contact with the air above the water level to thereby increase the dissolved oxygen. However, this method can only increase the dissolved oxygen in the area adjacent to the water level, but the dissolved oxygen in deep water is still very low.

With reference to FIG. 11, another kind of oxygen supply machine 5 is shown, which also has a frame 53, floats 531 mounted on both sides of the frame 53 for buoying the frame 53 up, a motor 51 mounted on a top side of the frame 53, and a tank 52 below the frame 53. An output shaft 511 is located in the tank 52, and a vane 512 is mounted on the output shaft. A water inlet 521 is provided in the bottom of the tank 52. A water outlet tube 522 is mounted on a side of the tank 52. A conduit 523 is mounted on a side of the water outlet tube 522. One end of the conduit 523 is extended upwards to above the water level for introducing ambient air into the water outlet tube 522. When the vanes 512 are turned by the motor 51, water in the cultivation pool is sucked by the vanes 512 via the water inlet 512 into tanks 52 and then exits via the water outlet tube 522, creating circulating water currents during which the water flowing through the water outlet tube 522 comes into contact with air in the conduit 523 while creating a suction force for sucking ambient air into the water via the conduit 523. Thus, the dissolved oxygen is increased.

However, after using the aforementioned method to increase the dissolved oxygen in water, it is found that the aquatics intend to gather around the oxygen supply machine 5 because the circulating water currents flow through a small area. In other words, water with high dissolved oxygen is only distributed in a small area around the oxygen supply machine 5 instead of wide, uniform distribution in the cultivation pool. As a result, the dissolved oxygen in the water area away from the oxygen supply machine is still insufficient. Thus, the conventional oxygen supply machine 5 still fails to effectively solve the problems of high-density cultivation.

SUMMARY OF THE INVENTION

In order to solve the problems of conventional art, a speed-increasing machine for water in accordance with the present invention comprises a frame member, a motor mounted on the frame, a plurality of buoyant member mounted below the frame member, and a shielding cover mounted on the frame member and outside the motor.

A rotating shaft of the motor is attached to a guide vane set. The guide vane set has a main rod provided with several vanes on a lower end of the main rod. A guide wheel is provided on a lower side of the vanes. The guide wheel is obliquely provided with a plurality of guide plates.

With the above structure, the present invention can produce the circulation of water in the cultivation pool. Further, oxygen can be more easily to be dissolved in the water by the rotation of the guide vane set.

DETAILED DESCRIPTION OF THE PREFERRED EMBODIMENT

The structure and effect of the embodiment of the present invention will be described in detail with reference to the accompanying drawings.

Figure 4:
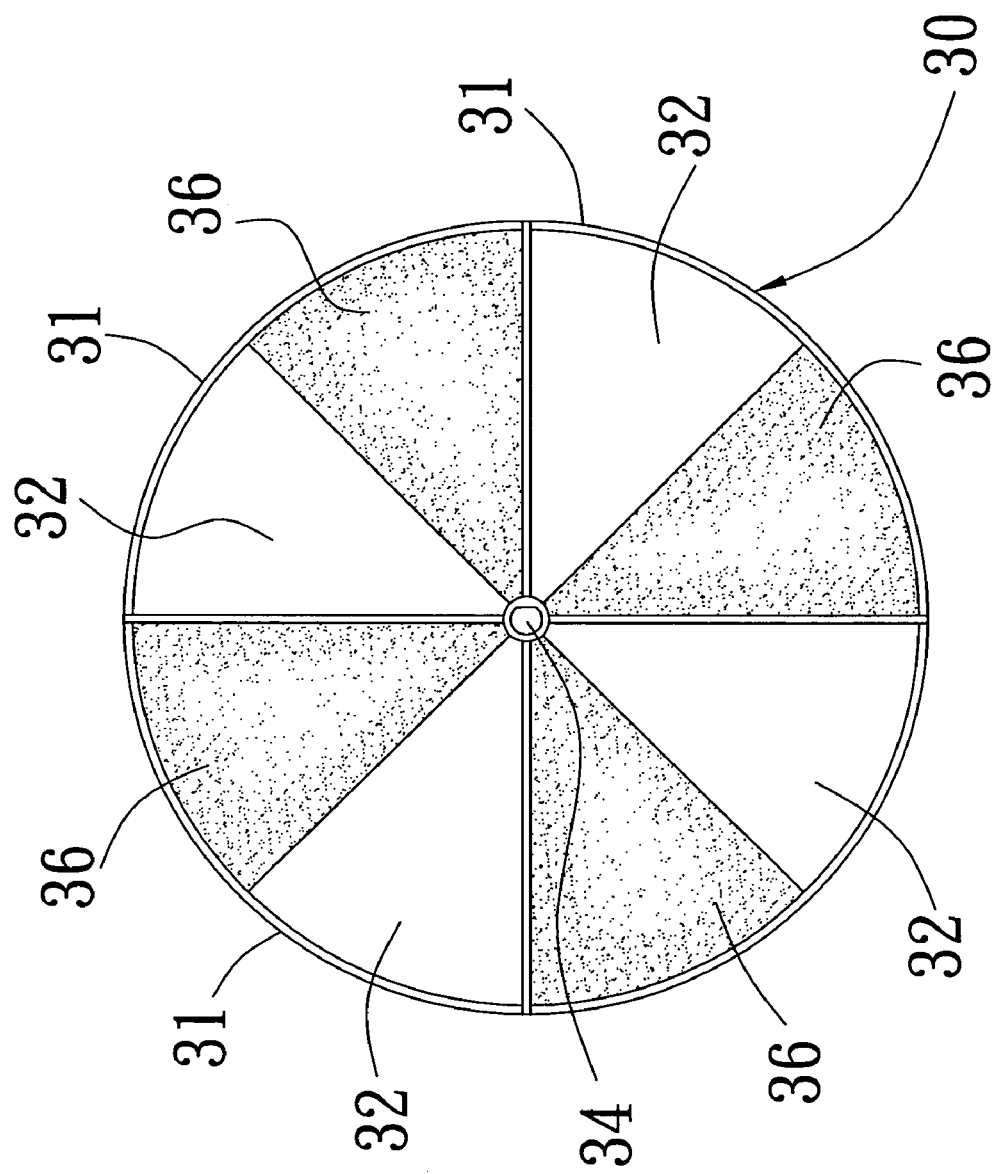
FIG. 4 is a top view showing the guide vane set of the speed-increasing machine in accordance with the present invention.
Figure 5:
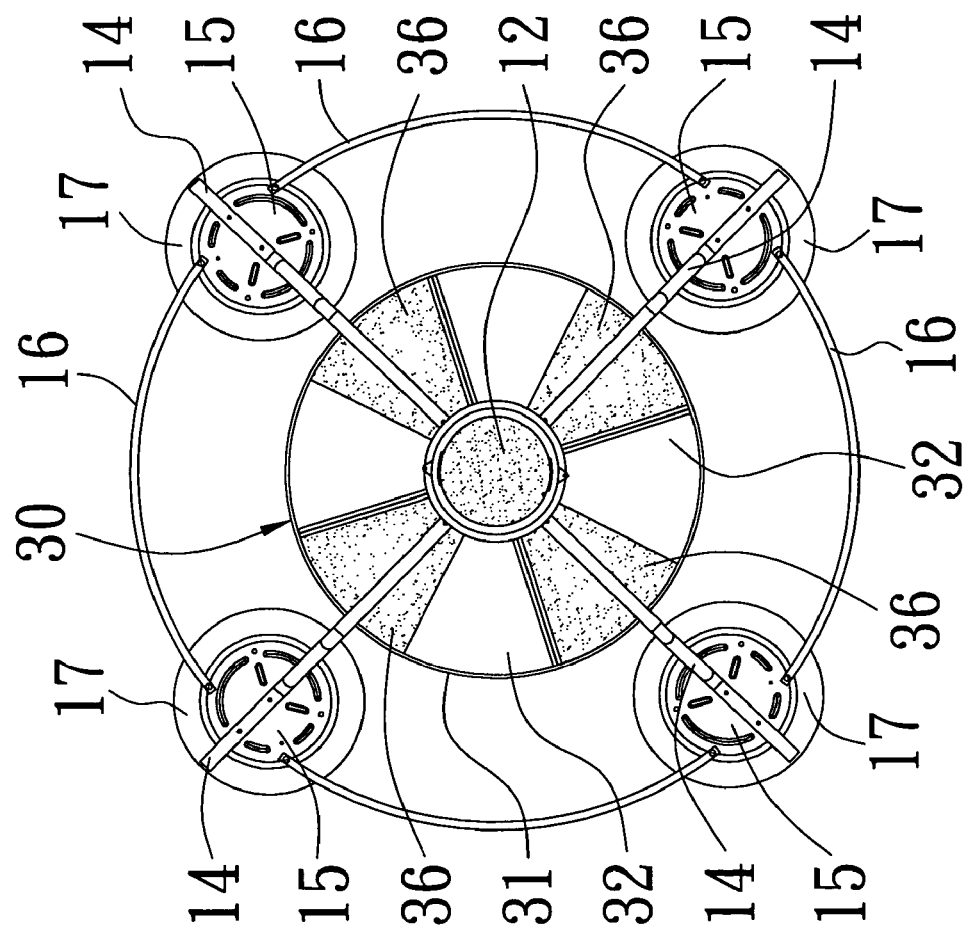
FIG. 5 is a top view showing the guide vane set of the speed-increasing machine in accordance with the present invention.
Figure 6:
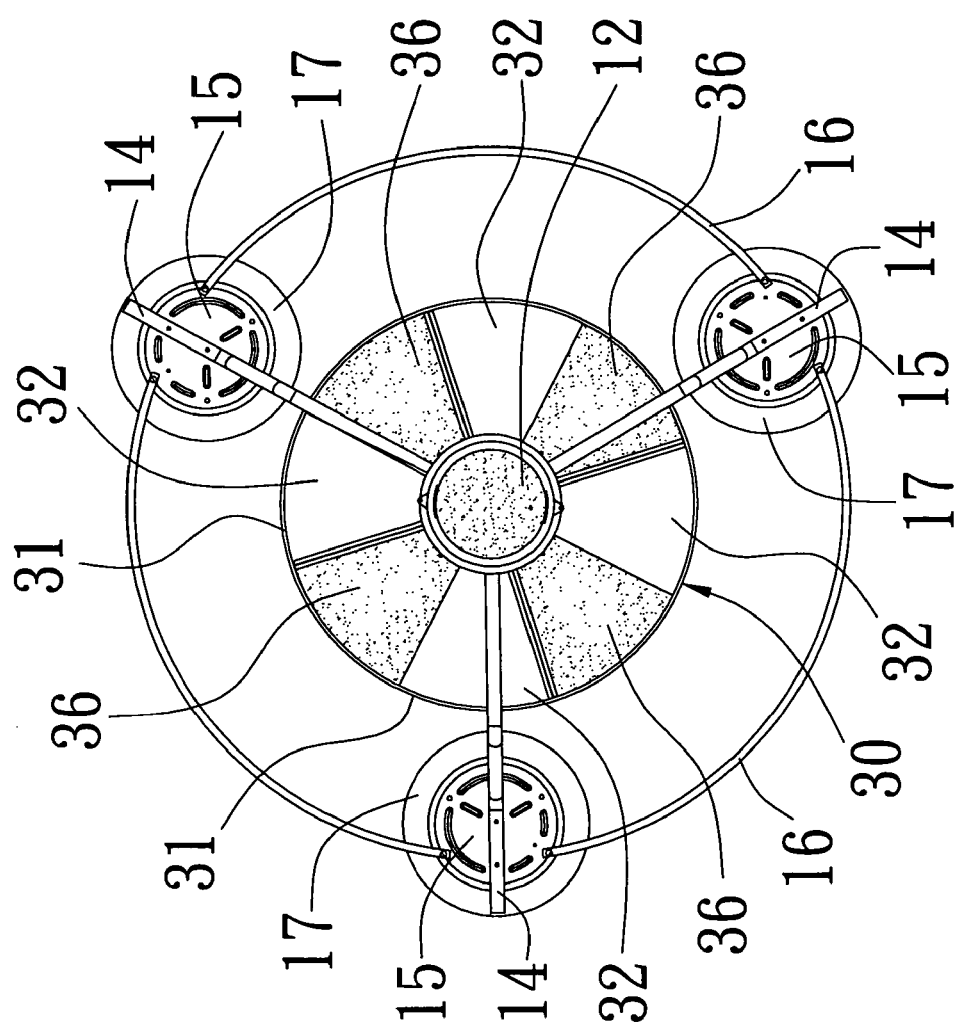
FIG. 6 is a top view showing an alternative embodiment of the speed-increasing machine ; in accordance with the present invention.

With reference to FIGS. 1 to 5, the speed-increasing machine comprises a frame member 1, a plurality of extended rods 14 provided on the frame member 1, a buoyant member 13 mounted on the end of each extended rod 14. The buoyant member 13 can be a buoy or any buoyant material for floatingly supporting the frame member 1 on the water level, such as the buoyant member 13 of the present embodiment has a spherical shape. The end of the extended rod 14 is fixed with a fixing plate 15. An arc link 16 is connected between two adjacent fixing plates. The center of the frame member 1 is provided with a motor 2. A shielding cover 12 is provided outside the motor 2 for protection purpose. A guide vane set 3 is mounted on the lower end of the frame member 1 with attached to the motor. With the motor 2, the guide vane set 3 can rotate an thus produce the circulation of water. The number of the buoyant member 13, extended rod 14 and fixing plate 14 of the present embodiment can be increased or decreased depending on the actual condition, as shown in FIG. 6.

With reference to FIG. 4, the present invention is characterized in that a wide area of circulation can be created by rotating the specific guide wheel 30, and that the circulation of water comes into contact with the ambient air above the water level to increase the dissolved oxygen, and the water with high dissolved oxygen can be uniformly distributed in the cultivation pool by the wide area of circulation. Further, the figures of the present invention disclose a structure relating to a guide wheel 30, all shown as the guide wheel 30 rotating to the left (in a counterclockwise direction). The guide vane set 3 has a main rod 33 provided with a coupling hole 34 on a face of one end. The shape of the coupling hole 34 is the same as that of the rotating shaft 21 of the motor 2 so that the latter can penetrate into the coupling hole 34 and join with it. Further, a pin 22 is transversely provided for more stably connection. A plurality of vanes 35 are provided on the end of the main rod 33. The vanes 35 are vertically extended along the main rod 33, and also can be annularly equispaced. A plurality of spaced through holes 351 are provided on the vertical surface of the vanes 35.

A guide wheel 30 is mounted below the main rod 33 and the vanes 35. The guide wheel 30 has two upper and lower rings 31, and is separated into a plurality of sectors 32 by the vanes 35. A plurality of fenders 37 are provided between the two rings 31 and near the vanes 35. Each fender 37 is spaced away corresponding to the vanes 35 so that a space 38 is formed between two adjacent fenders 37. Thus, each sector 32 includes a fender 37 and a space 38. A guide plate 36 is provided in each sector 32 and near the fender 37. Each guide plate 36 is formed as a triangular sheet and comprises three sides and three apexes. One side of each guide plate 36 adjoins the bottom edge of each vane 35, with an apex being located at the lower end of the main rod 33 and an apex being located at the fender 37 adjacent to vane 35. The remaining apex is located near the diagonal of the above two apexes, so that each guide plate 36 extends and inclines upwards near one side of the vanes 35.

Figure 1:
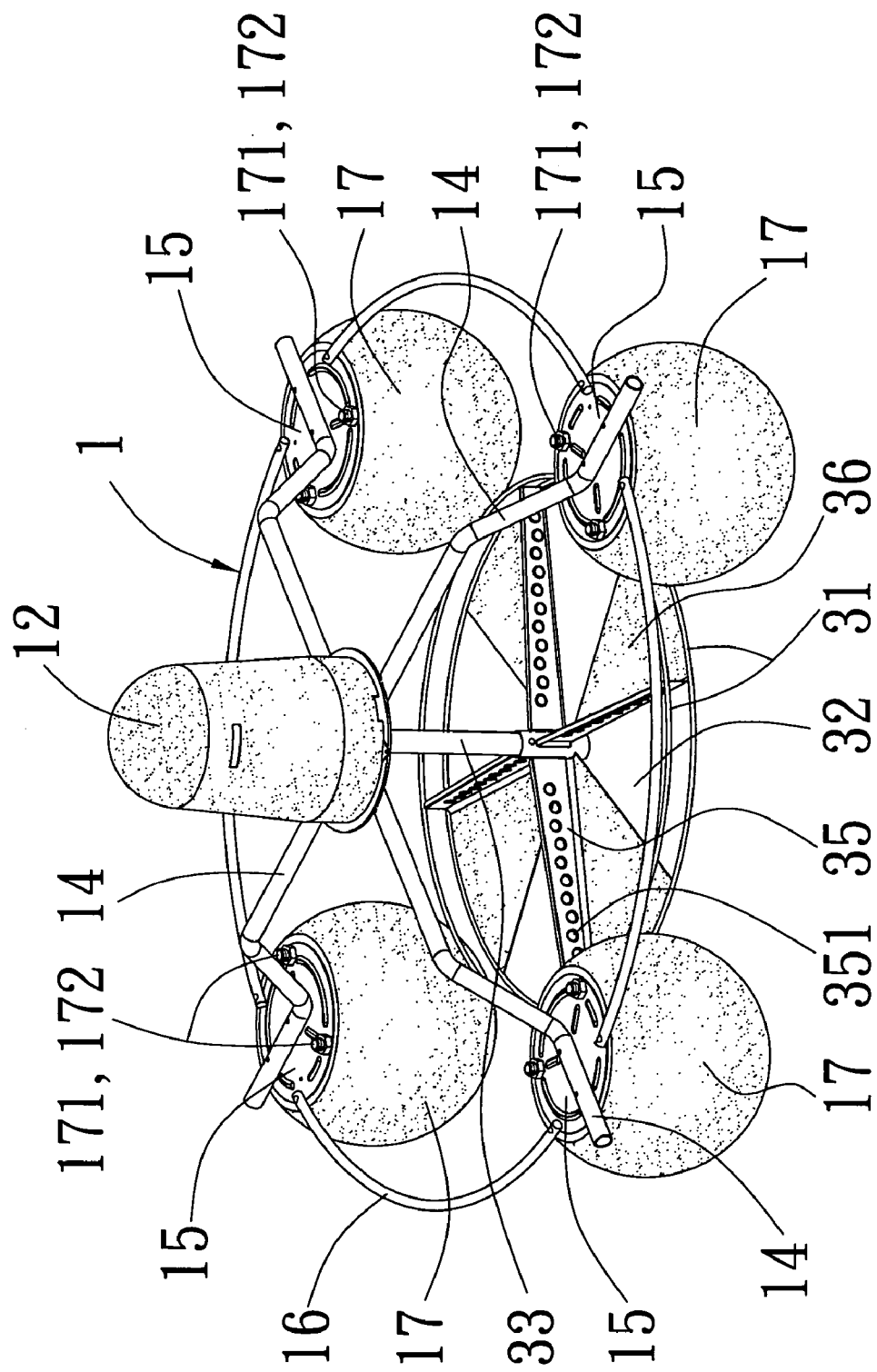
FIG. 1 is a top perspective view showing the speed-increasing machine in accordance with the present invention, in which the guide vane set rotates in a counterclockwise direction.
Figure 2:
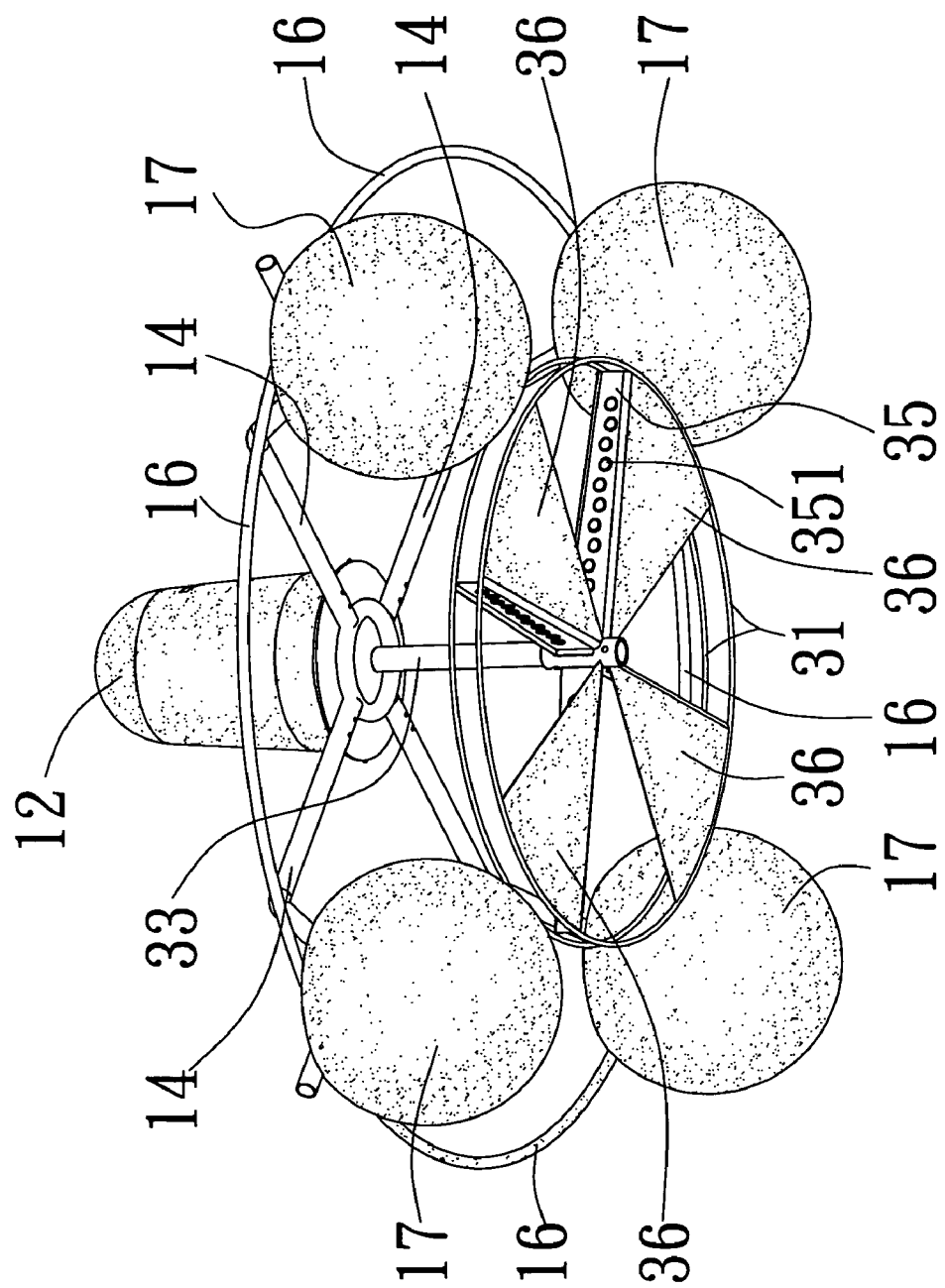
FIG. 2 is a bottom perspective view showing the speed-increasing machine in accordance with the present invention.
Figure 3:
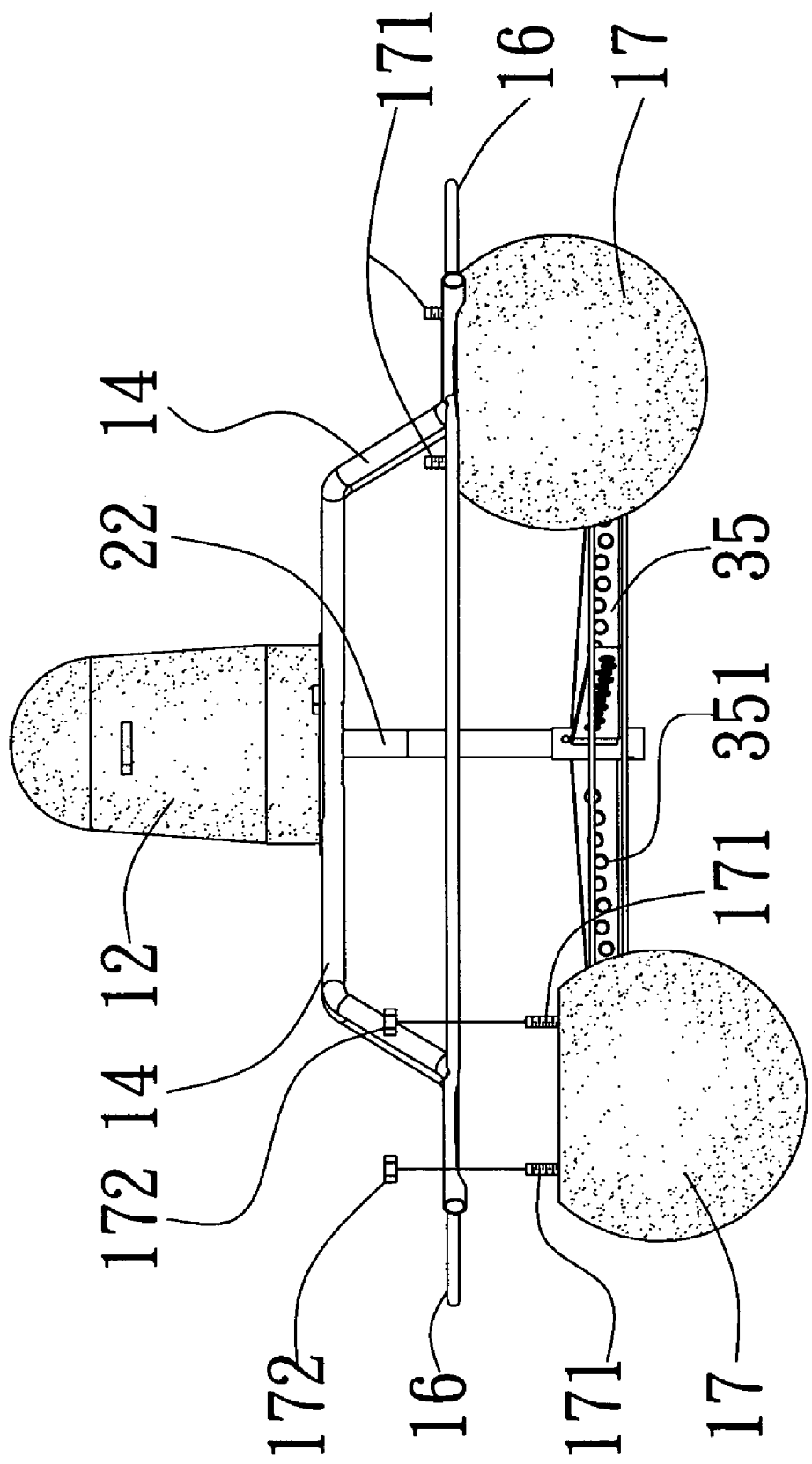
FIG. 3 is a schematic view showing the assembly of the buoyant member of the speed-increasing machine.
Figure 10:
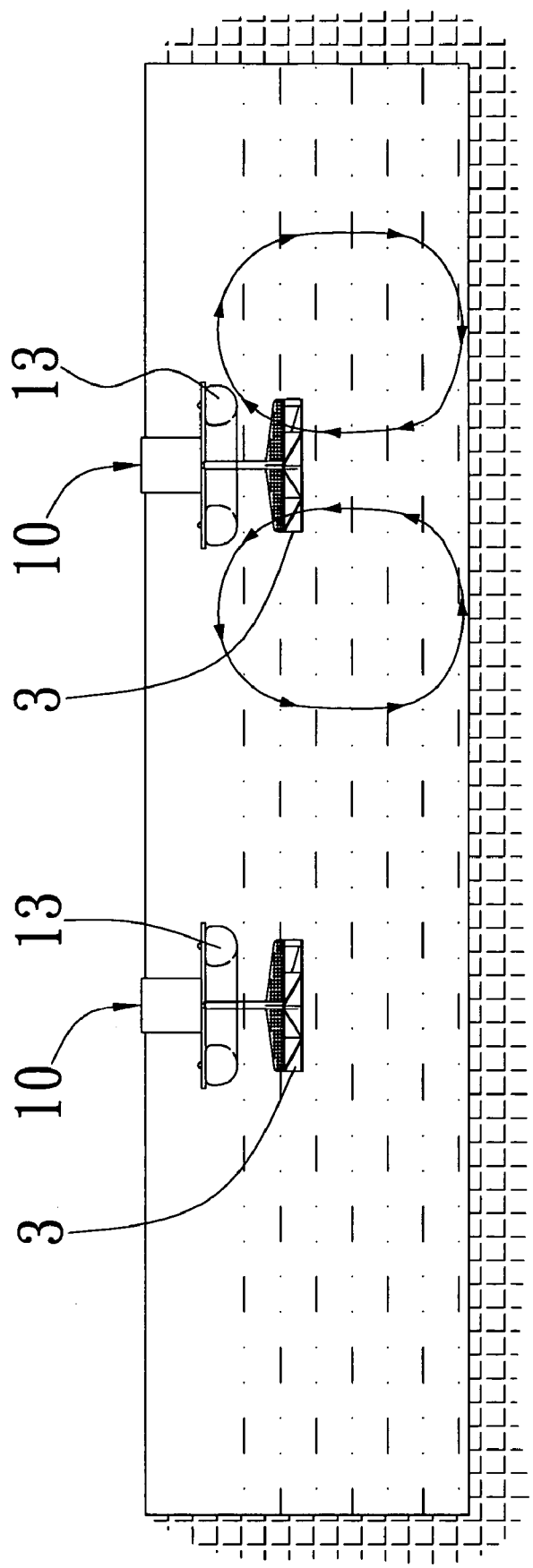
FIG. 10 is a schematic view showing that the speed-increasing machine in accordance with the present invention is practically used in a cultivation pool for circulating the water.
Figure 11:
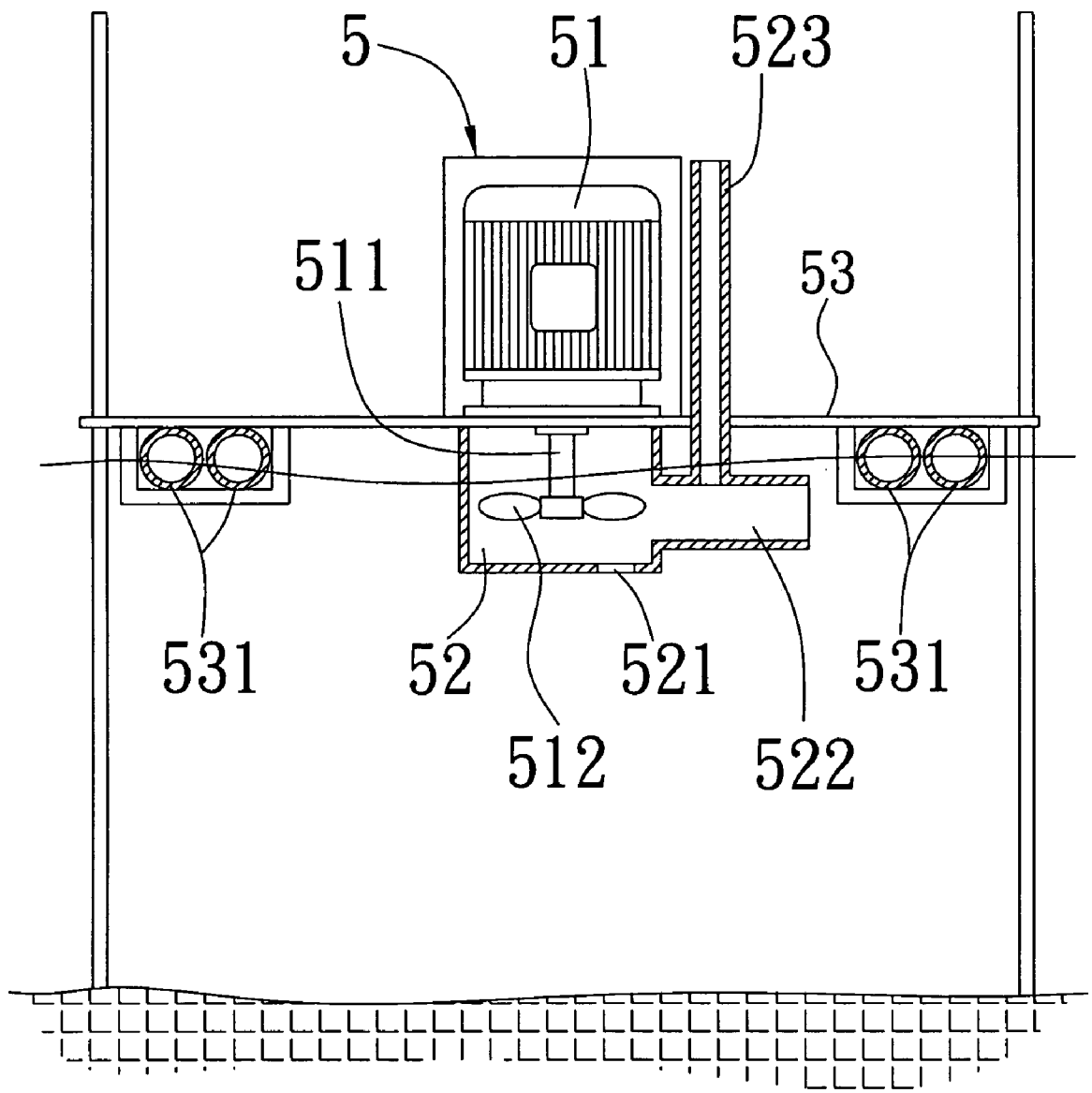
FIG. 11 is a side view showing a conventional oxygen supply machine used in a cultivation pool.

With reference to FIG. 1 and FIG. 10 again, the speed-increasing machine should be located in the cultivation pool 4 during operation. At that time, the guide vane set 3 is located below the water level, while the frame member 1 and the motor 2 buoy up by the buoyant member 13. Since the flow direction of the water can be influenced by the northern and southern magnetic poles, if the speed-increasing machine of the present invention is used in a cultivation pool in northern hemisphere, the guide vane set 3 disclosed in the figures of the present invention should preferably rotate in a counterclockwise direction. The guide plate 36 thus can preferably inclined to the right along the rotating direction. Thus, deep water in the cultivation pool flows upward under the guiding by the guide plates 36 when the vanes 35 turn. The space 38 of the guide wheel 30 provide a path for the water to flow into and out of the guide wheel 30. Since a negative pressure is created when the guide vane set 3 rotates to create water current, the deep water in the cultivation pool flows upwards under the action of the negative pressure. Since the water in the cultivation pool flows the vaes 35 when the vanes 35 rotating, the flowing speed on the front surface is lower than that on the back surface, the through holes 351 individually provided on the vertical face of the vanes 35 can receive the water current in the through holes 351. According to Torricelli Formula derived from the Bernoulli Theorem $\upsilon=\sqrt{2gh}$, in which $\upsilon$ is the flowing speed of the through hole 351; h is the distance from the through hole 351 to the water level of the cultivation pool. It can be seen that the flowing speed of water at the through hole 351 is identical to the falling speed of a particle from the water level to the through hole 351. Further, when the flowing speed is $\upsilon\infty$ and the pressure is $p\infty$, in such condition, the water flows around the guide wheel 30. After the water is stopped by the rotation of the guide wheel 30, the flowing speed of water is zero at a stationary point at a front edge of the through hole 351 of the vane 35. According to the Bernoulli Theorem, the pressure at the stationary point is $p_0 = p\infty + \rho \upsilon^2 \infty/2$.

That is, the total pressure is just identical to the sum of the stationary pressure $p\infty$ and the dynamic pressure $\rho\upsilon^2\infty/2$. Thus, the water in the cultivation pool flows through the vanes 35 with the vanes 35 rotating, the flowing speed on the front surface of the vane 35 is lower than that on the back surface, that is to say, the pressure on the front surface of the vane 35 is higher than that on the back surface, thus creating a lifting force. As a result, a wide range of circulation of water can be created and the circulating water comes into contact with the ambient air above the water level to increase the dissolved oxygen, to thereby distribute the circulating water to a deep and far area. By this way, the problems of conventional oxygen supply machines can be solved.

Figure 9:
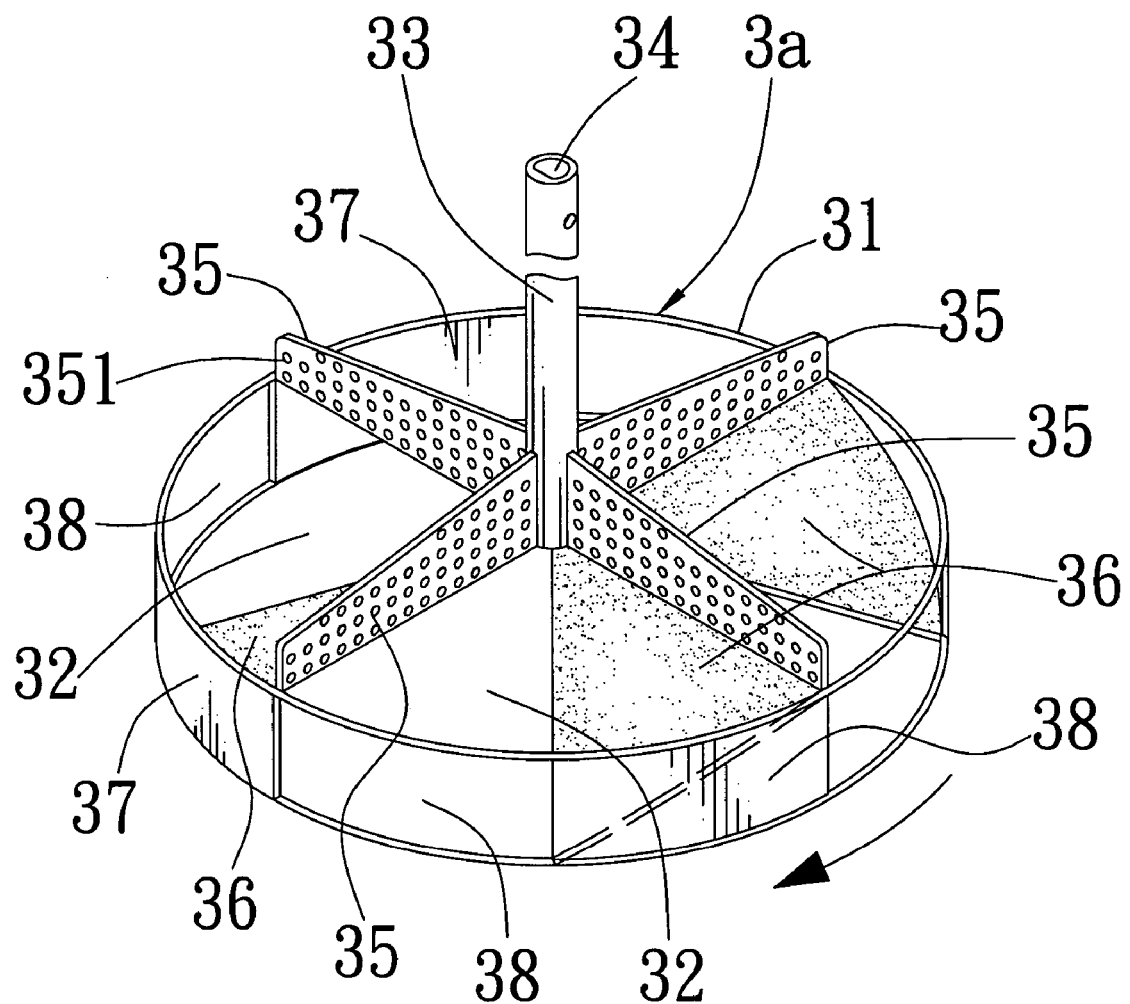
FIG. 9 is a perspective view, in which the guide vane set rotates in a clockwise direction.

Further, the northern and southern magnetic poles affect the water current, the guide vane set 3 of the present invention preferably rotates clockwise in the southern hemisphere. FIG. 9. shows a structure of a guide vane set 3a which slowly rotates clockwise. Since the rotating direction is reverse, the guide plate 36 should be inclined to the left (the left is lower and the right is higher) corresponding to the rotating direction. The positions of the fender 37 of each sector 32 and the position of the space 38 should be exchanged corresponding to the inclination of the guide plate 36. Thus, the structure of FIG. 1 and that of FIG. 5 are in mirror symmetry, and a guide vane set that slowly rotates clockwise is formed.

Figure 7:
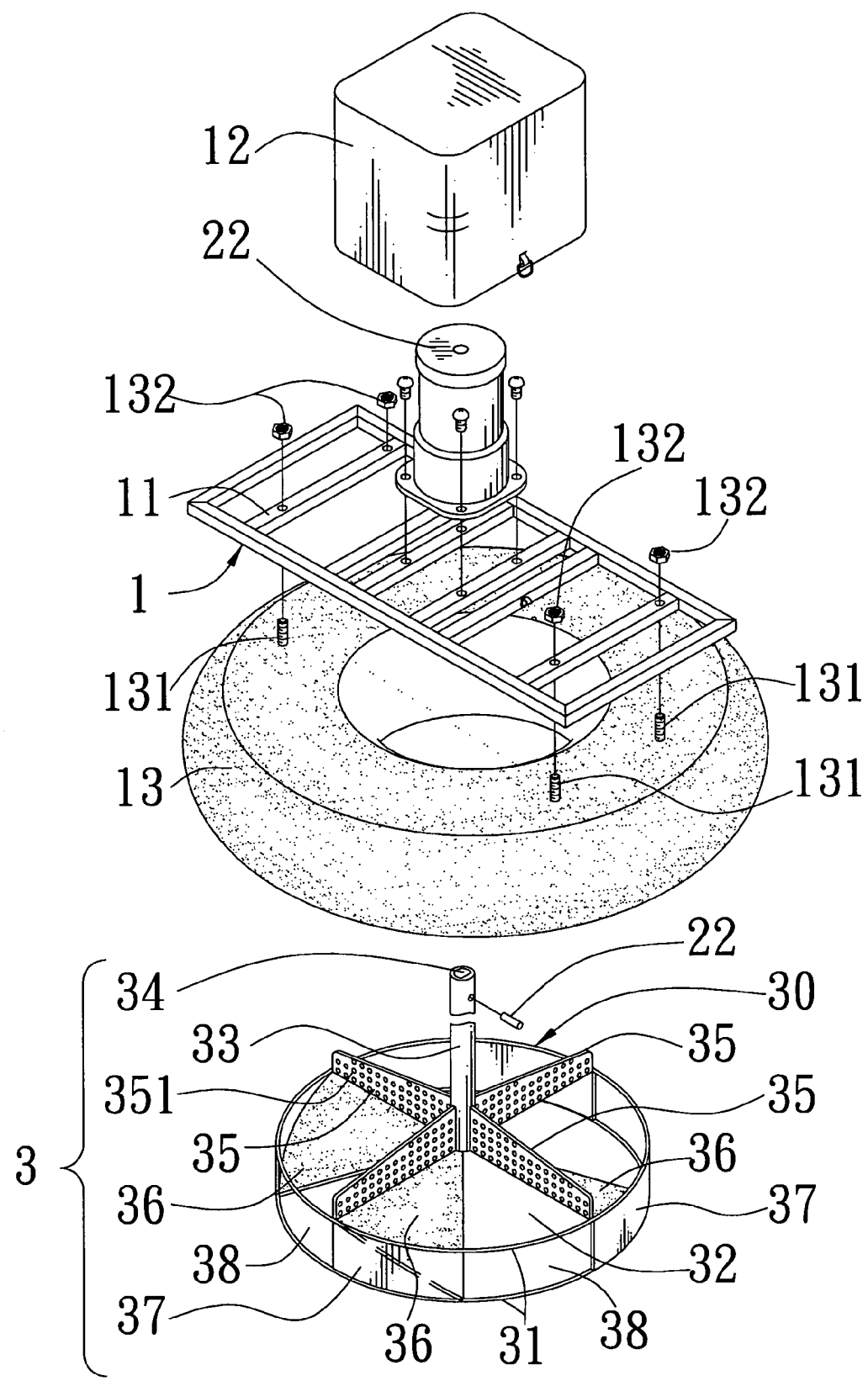
FIG. 7 is an exploded perspective view showing a third embodiment of the present invention.
Figure 8:
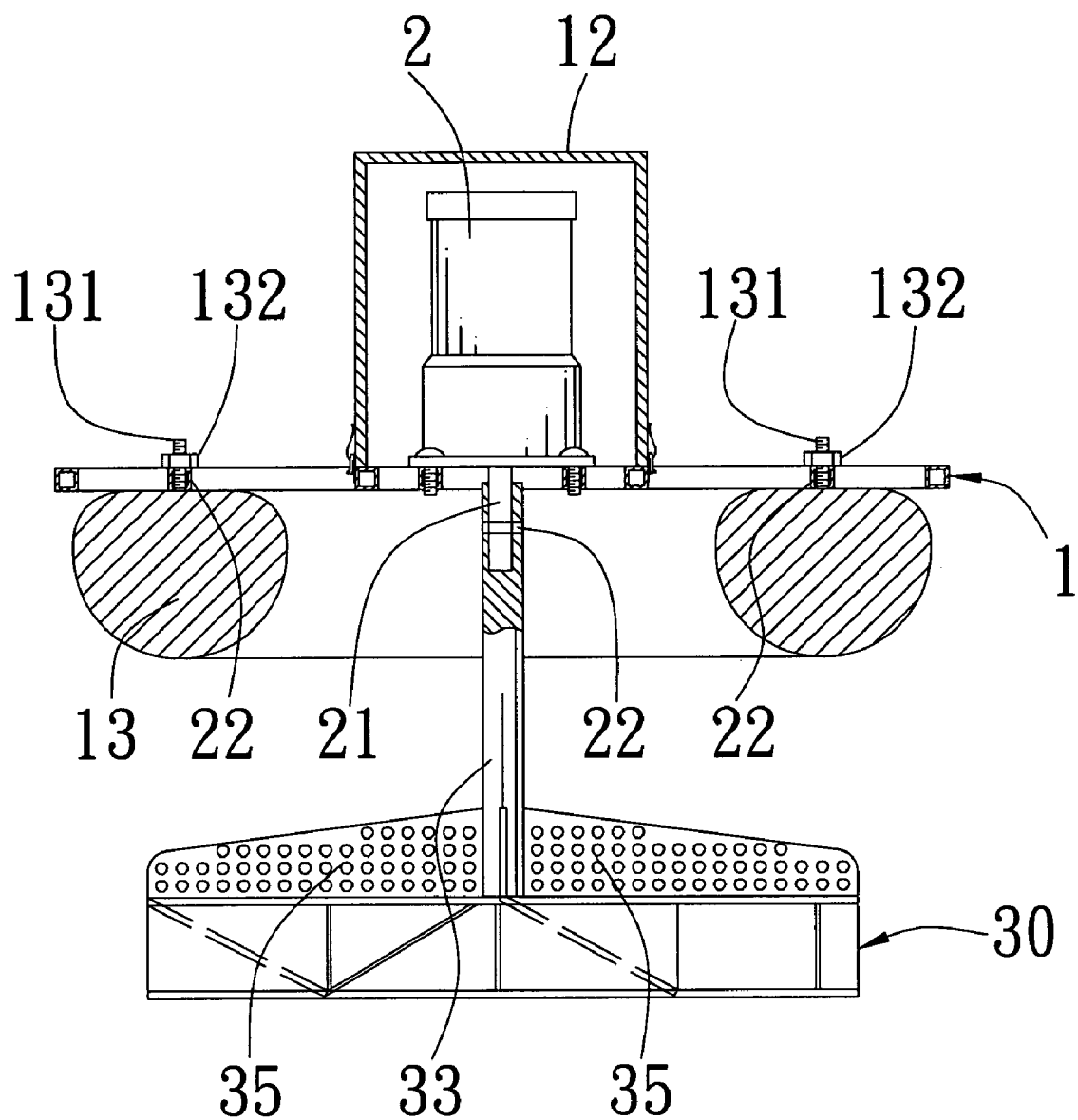
FIG. 8 is a sectional view showing the third embodiment of the present invention.

With reference to FIG. 7 and FIG. 8, the third embodiment of the present invention mainly comprises an annular buoyant member 13 instead of the spherical buoyant member 17. A plurality of screws 131 are provided on the upper surface of the buoyant member 13. The screws 131 can penetrate the fixing rod 11 and be secured by a nut 132.

With reference to FIG. 7 and FIG. 8 again, in the present invention, the modification on the frame member 1 is that a plurality of fixing rod 11 is provided on the frame member 1. A buoyant member 13 is respectively mounted on the lower end of the frame member 1 and the fixing rod 11 on both sides. Further, a motor 2 is provided in the center of the frame member 1 and near the fixing rod 11. A shielding cover 12 is provided outside the motor 2 for protective purpose. A guide vane set 3 is mounted on the lower end of the frame member 1 and attached to the motor 2. With the driving of the motor 2, the guide vane set 3 rotates to create the circulation of water.

According to the above, the rotating direction of the guide vane set 3 of the present invention can change depending on the northern or southern magnetic pole, to thereby obtain the optimal effect. The rotating direction of the guide plate 36 can be inclined to the right (the left is higher and the right is lower), or inclined to the left (the left is lower and the right is higher). The present invention can achieve the aforementioned effects and indeed conform to the requirements for a utility model patent.

What is claimed is:

1. A speed-increasing machine for water, comprising:
   a frame member;
   at least one buoyant member mounted to a lower end of the frame member;
   a motor mounted on an upper end of the frame member and including a rotating shaft;
   a guide vane set including a main rod coupled to the rotating shaft, a plurality of vanes provided on the end of the main rod, and a guide wheel provided below the vanes, wherein the vanes separate the guide wheel into a plurality of sectors, two opposite upper and lower rings are mounted to the outer periphery of the guide wheel corresponding to the vanes, and an inclined guide plate is provided between an associated one of the sectors and an associated one of the vanes.

2. The speed-increasing machine for water according to claim 1, wherein at least one fender is provided between the two opposite upper and lower rings, and a space is formed between adjacent two fenders, so that each sector includes one fender and one space.

3. The speed-increasing machine for water according to claim 1, wherein when the guide vane set rotates counter-clockwise, the guide plate is inclined to the right with the left side located higher and the right side located lower.

4. The speed-increasing machine for water according to claim 3, wherein each guide plate is formed as a triangular sheet and comprises three sides and three apexes, one side of each guide plate adjoins the bottom edge of each vane with an apex being located at the lower end of the main rod and another apex being located at the fender adjacent to vane, the remaining apex being located near the diagonal of the above two apexes of the fender, to thereby form an inclined guide plate.

5. The speed-increasing machine for water according to claim 1, wherein when the guide vane set rotates clockwise, the guide plate is inclined to the left with the left side located lower and the right side located higher.

6. The speed-increasing machine for water according to claim 5, wherein each guide plate is formed as a triangular sheet and comprises three sides and three apexes, one side of each guide plate adjoins the bottom edge of each vane with an apex being located at the lower end of the main rod and another apex being located at the fender adjacent to vane, the remaining apex being located near the diagonal of the above two apexes of the fender, to thereby form an inclined guide plate.

7. The speed-increasing machine for water according to claim 1, wherein each guide plate is formed as a triangular sheet and comprises three sides and three apexes, one side of each guide plate adjoins the bottom edge of each vane with an apex being located at the lower end of the main rod and another apex being located at the fender adjacent to vane, the remaining apex being located near the diagonal of the above two apexes of the fender, to thereby form an inclined guide plate.

8. The speed-increasing machine for water according to claim 1, wherein a coupling hole is provided on an end face of the main rod to correspond to the rotating shaft of the motor, so that the rotating shaft of the motor is adapted to penetrate the coupling hole and couple thereto.

9. The speed-increasing machine for water according to claim 1, wherein a plurality of fixing rods are provided on the frame member, and the motor and each buoyant member are respectively secured on the fixing rod of the frame member.

10. The speed-increasing machine for water according to claim 1, wherein a shielding cover is provided outside the motor, and is detachably coupled to the frame member to cover the motor.

11. The speed-increasing machine for water according to claim 1, wherein a plurality of extended rods are provided on the frame member, a fixing plate is secured on one end of each extended rod, the buoyant member is secured to the fixing plate, and an arc link is connected between two adjacent fixing plates.

12. The speed-increasing machine for water according to claim 1, wherein a plurality of fixing rods are provided on the frame member, and the buoyant member is mounted to the lower end of the frame member and located at the fixing rods on both sides.

* * * * *